United States Patent [19]

Johnson et al.

[11] Patent Number: 5,401,406

[45] Date of Patent: Mar. 28, 1995

[54] FILTER ASSEMBLY HAVING A FILTER ELEMENT AND A SEALING DEVICE

[75] Inventors: Mark W. Johnson; Stephen A. Geibel, both of Cortland; Tanweer Haq, Tully, all of N.Y.

[73] Assignee: Pall Corporation, East Hills, N.Y.

[21] Appl. No.: 988,642

[22] Filed: Dec. 11, 1992

[51] Int. Cl.[6] .................... B01D 39/20; C04B 41/50
[52] U.S. Cl. .................. 210/323.2; 210/450; 210/451; 210/510.1; 55/523; 277/26
[58] Field of Search ............. 210/323.2, 450, 451, 210/323.1, 449, 232, 541, 542, 510.1; 55/378, 379, 484, 490, 523, 355; 277/26

[56] References Cited

U.S. PATENT DOCUMENTS

| | | | |
|---|---|---|---|
| Re. 24,954 | 3/1961 | Church | 55/523 |
| 2,514,366 | 7/1950 | Beyland | 210/450 |
| 2,526,651 | 10/1950 | Garbo | 55/523 |
| 2,548,875 | 4/1951 | Degnen et al. | 55/523 |
| 2,892,510 | 6/1959 | Wygant | 55/523 |
| 2,948,555 | 8/1960 | Wright | 277/26 |
| 3,055,745 | 9/1962 | Drummond et al. | 55/523 |
| 3,436,341 | 4/1969 | Beuthe | 210/7 |
| 3,436,898 | 4/1969 | Kaess et al. | 55/523 |
| 3,503,516 | 3/1970 | Harms et al. | 210/323.2 |
| 3,642,141 | 2/1972 | Hobson, Jr. | 210/323.2 |
| 3,768,661 | 10/1973 | Coates | 210/449 |
| 3,780,868 | 12/1973 | Miles, II | 210/333.1 |
| 3,924,863 | 12/1975 | Nakano et al. | 277/26 |
| 4,105,562 | 8/1978 | Kaplan et al. | 210/323.2 |
| 4,186,101 | 1/1980 | Reinhardt | 210/497 R |
| 4,251,680 | 2/1981 | Germann | 277/26 |
| 4,336,035 | 6/1982 | Evenstad et al. | 55/379 |
| 4,449,422 | 5/1984 | Fuehrer et al. | 277/26 |
| 4,461,707 | 7/1984 | Thayer et al. | 210/339 |
| 4,522,719 | 6/1985 | Kuwajima et al. | 210/457 |
| 4,615,261 | 10/1986 | Meijer | 277/26 |
| 4,645,596 | 2/1987 | Kuwajima | 210/193 |
| 4,673,187 | 6/1987 | Hanson et al. | 277/26 |
| 4,713,174 | 12/1987 | Zievers et al. | 210/323.2 |
| 4,725,356 | 2/1988 | Zievers et al. | 210/451 |
| 4,728,423 | 3/1988 | Kuwajima | 210/323.2 |
| 4,735,638 | 4/1988 | Ciliberti et al. | 55/523 |
| 4,770,772 | 9/1988 | Kuwajima et al. | 210/184 |

(List continued on next page.)

FOREIGN PATENT DOCUMENTS

| | | | |
|---|---|---|---|
| 3186311 | 8/1991 | Japan | 55/523 |
| 8605118 | 9/1986 | WIPO | |

OTHER PUBLICATIONS

Zievers, "Choose the Right Ceramic for Filtering Hot Gases", Chemical Engineering Progress, Jan. 1993.

Lippert et al, "Development and Commercialization of Hot Gas Filtration Systems", ASME 1991, pp. 1073-1079.

(List continued on next page.)

*Primary Examiner*—Cynthia L. Nessler
*Attorney, Agent, or Firm*—Leydig, Voit & Mayer

[57] ABSTRACT

The present invention provides a filter sealing device for a filter element. The filter element includes an end portion defining an opening. The sealing device includes a body having a first section attached to a second section. The first section is positionable within the opening in the filter element with the second section facing an open end portion of the filter element. The first section has a larger coefficient of thermal expansion than the end portion of the filter element so that an increase in temperature results in the first section of the body expanding at a greater rate than the end portion of the filter element. These differing rates of expansion cause a compressive force to be exerted between the first section of the body and the end portion of the filter element.

21 Claims, 3 Drawing Sheets

U.S. PATENT DOCUMENTS

| | | | |
|---|---|---|---|
| 4,813,342 | 3/1989 | Schneider et al. | 277/26 |
| 4,885,014 | 12/1989 | Reinhardt et al. | 55/484 |
| 4,886,533 | 12/1989 | Sakashita et al. | 55/523 |
| 4,889,630 | 12/1989 | Reinhardt et al. | 210/490 |
| 4,909,813 | 3/1990 | Eggerstedt | 55/302 |
| 4,946,487 | 8/1990 | Butkus | 55/523 |
| 4,960,448 | 10/1990 | Zievers | 55/523 |
| 4,979,969 | 12/1990 | Herding | 55/523 |
| 5,004,545 | 4/1991 | Wahl et al. | 55/523 |
| 5,037,115 | 8/1991 | Brandon | 277/26 |
| 5,037,461 | 8/1991 | Zievers et al. | 55/523 |
| 5,059,227 | 10/1991 | Kilicaslan et al. | 55/490 |
| 5,080,557 | 1/1992 | Berger | 277/26 |
| 5,171,337 | 12/1992 | Pollack | 55/523 |
| 5,185,019 | 2/1993 | Haldipur et al. | 55/378 |
| 5,202,021 | 4/1993 | Griffin | 210/323.2 |
| 5,205,850 | 4/1993 | Jenrich et al. | 55/523 |
| 5,209,844 | 5/1993 | Zievers et al. | 210/323.2 |
| 5,223,012 | 6/1993 | Best et al. | 55/523 |
| 5,223,138 | 6/1993 | Zievers et al. | 55/523 |
| 5,296,010 | 3/1994 | Clark et al. | 55/523 |

OTHER PUBLICATIONS

Weitzel, "Study of the Application of an Advanced Ceramic Tube Filter in a Commercial PFBC Plant", ASME 1991, pp. 33–40.

Mustonen et al, "Technical and Economic Analysis of Advanced Particle Filters for PFBC Applications", ASME 1991, pp. 475–480.

Kurkela et al, "Removal of Particulates and Alkali Metals from Pressurized Fluid-Bed Gasification of Peat and Biomass-Gas Cleanup for Gas Turbine Applications", IGT Conference 1991.

Durst et al, "The Performance of High Efficiency High Temperature Ceramic Gas Filter Elements", 5th World Filtration Conference, pp. 516–523.

Sawyer et al, "Corrosion and Degradation of Ceramic Particulate Filters in Direct Coal-Fired Turbine Applications", Gas Turbine and Aeorengine Congress and Exposition, 1990, pp. 1–8.

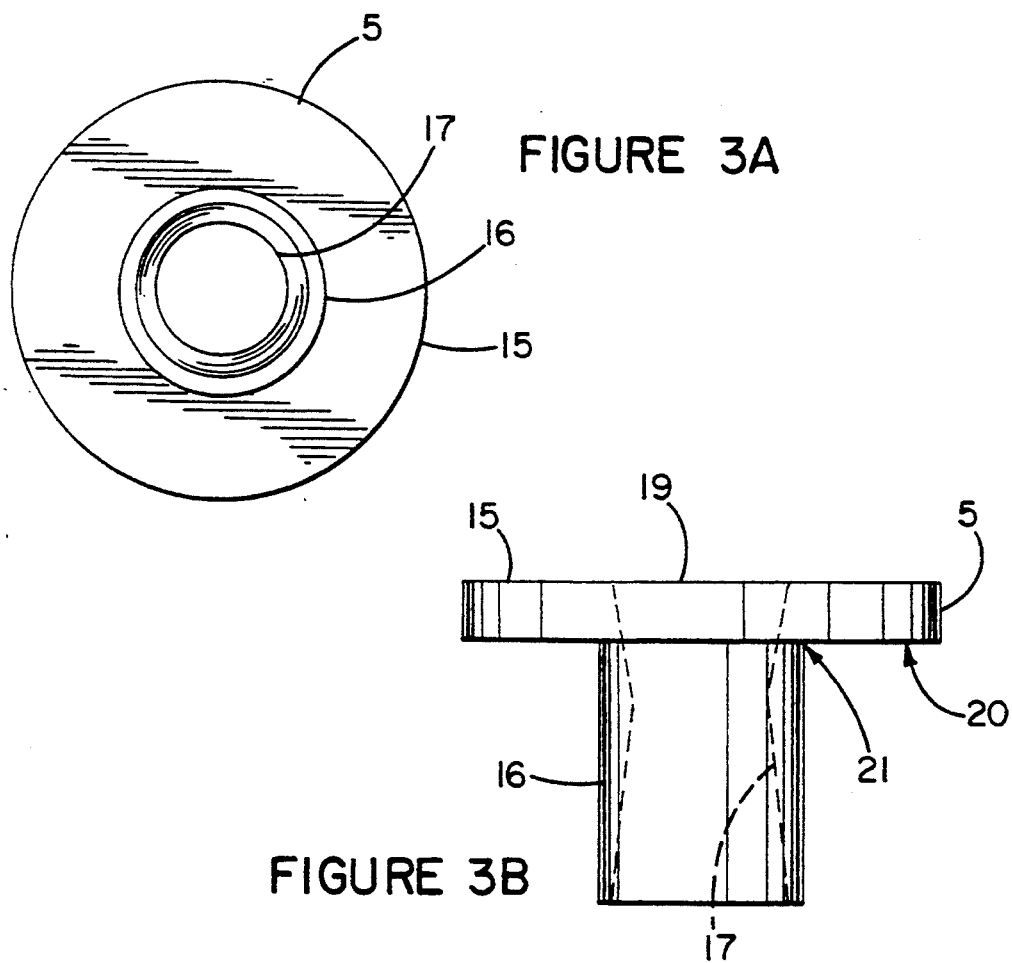
FIGURE 3A
FIGURE 3B
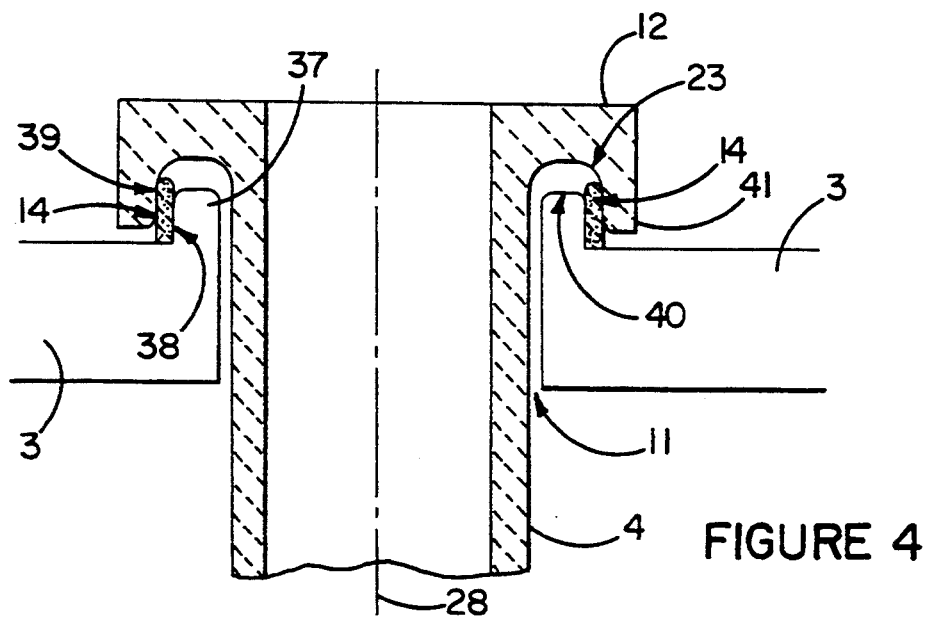
FIGURE 4

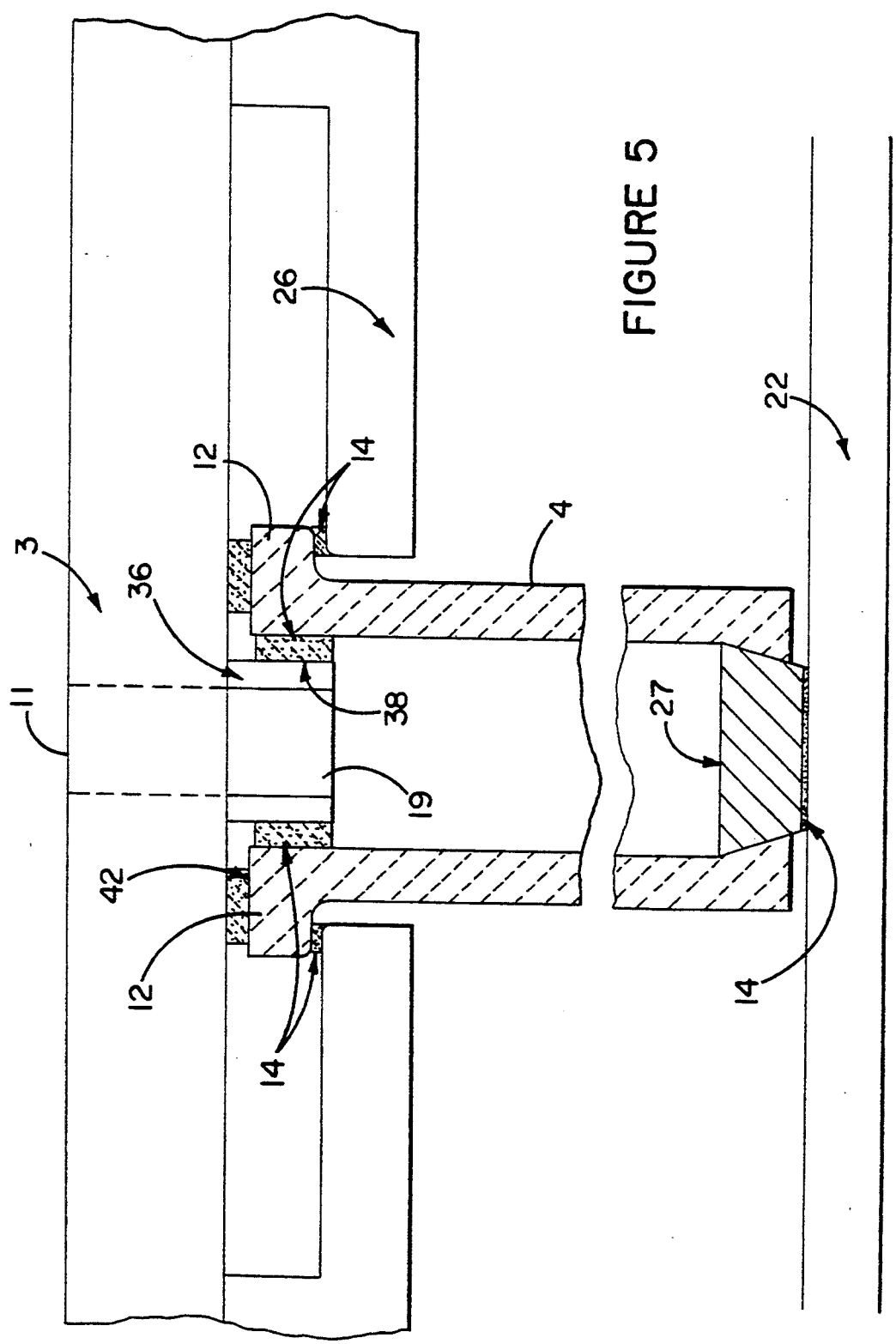

FILTER ASSEMBLY HAVING A FILTER ELEMENT AND A SEALING DEVICE

TECHNICAL FIELD

The present invention relates to filter assemblies which may be used, for example, to remove particulates from high temperature fluids.

BACKGROUND ART

Tube type filters are typically used in industrial processes for purifying fluids in either the gaseous or liquid phase. Typical applications include, but are not limited to, coal gasifiers, fluidized bed combustors, smelters, and catalytic crackers.

As disclosed in U.S. Pat. No. 4,725,356, conventional tube-type filters generally comprise a tank or pressure vessel which is divided into an inlet portion and an outlet portion by a relatively rigid support member called a tube sheet. The tube sheet preferably forms a fluid tight seal between the inlet portion and the outlet portion and typically has a series of holes or apertures spaced from one another. Filter elements are mounted in the apertures of the tube sheet.

One type of conventional filter element is made of a porous ceramic material and is commonly referred to as a candle filter. Candle filters are particularly effective in removing particulates from high pressure, high temperature gases. A candle filter typically comprises a hollow, cylindrical tube that may have a narrow, elongated cross section, for example, a diameter in the range of 5–17 cm, and a length in the range of 0.1–3.0 m. The hollow tube typically has one end which is closed, one end which is open, and a porous, ceramic side wall. The porous side wall extends between the ends of the tube and defines an internal cavity that opens at the open end of the tube. The open end of the tube usually has a flange.

In a typical arrangement, one or more filter elements are arranged vertically inside the tank. Each filter element is inserted through an aperture in the tube sheet and is normally positioned such that the porous side wall and the closed end are located in the inlet portion of the tank while the flange of the tube is mounted to the tube sheet with the open end of the filter element communicating with the outlet portion of the tank. The flange has a larger diameter than the side wall of the filter element and allows the filter element to be located in and suspended by the tube sheet. A gasket material may be disposed between the flange and the tube sheet to form a seal and prevent bypass of unfiltered process fluid. A mechanism for clamping the filter elements against the tube sheet to secure the filter elements in position and maintain the seal is also provided.

With the filter elements mounted in place, a fluid, such as a gas laden with particulates, is introduced into the inlet portion of the tank. From the inlet portion, the gas passes through the porous wall of each filter element, where the particulates are removed from the gas, and into the internal cavity. The filtered gas then passes axially along the internal cavity of the filter elements and into the outlet portion of the tank through the open ends of the filter elements before exiting the tank through the outlet portion. As the fluid passes through the porous walls of the filter elements, particulates accumulate on the upstream side of the filter elements. With time, the particulates build up on the upstream side and form a particulate cake. The build-up of the particulate cake prevents fluid flow and, therefore, creates the need for the filter elements to be cleaned or replaced periodically.

One particularly effective method of cleaning the filter elements is by using a high pressure reverse gas flow. For example, cleaning may be accomplished by mounting a reverse cleaning fluid nozzle in close proximity to the open end of the filter element. A high pressure fluid (e.g., inert gas, air, or steam) is injected into the filter element in the reverse direction of normal fluid flow. The high pressure cleaning fluid is rapidly turned on and off to create a high pressure pulse in the back flow direction, dislodging the particulate cake formed on the upstream side of the filter elements.

Unfortunately, conventional tube-type filters are susceptible to a number of problems. Stress from improper clamping, mechanical vibrations, uneven contours on the filter surface or support, and thermal shock may result in damage to the filter element or leakage through the gasket. Back flow cleaning may introduce thermal shock to the filter elements if the high pressure reverse flow fluid is not at the same temperature as the filter elements. In addition, the use of a high pressure back flow cleaning pulse generates vibrations and mechanical stress on the filter elements. In candle filters, a common failure mode is cracking at the flange due to stress.

In addition, the tube sheet and the clamping mechanism are typically constructed using a metal alloy, while the filter element is typically construed of a ceramic material. Because ceramics typically have a much lower thermal coefficient of expansion than metal alloys, the ceramic filter elements and the metal tube sheet and clamping mechanism may expand at different rates due to temperature changes. These differing rates of thermal expansion can result in a reduction of the clamping force and leakage past the seal.

SUMMARY OF THE INVENTION

A principal object of the present invention is to effectively seal a filter element within a filter assembly.

Another principal object of the present invention is to reduce the stress at the flange of the filter element.

Additional objects of the present invention include sealing the filter element throughout the entire range of operating temperature of the filter assembly; providing multiple sealing surfaces to enhance reliability; providing a sealing mechanism which also functions to increase the efficiency of back flow cleaning.

Accordingly, the present invention provides a sealing device for a filter element having an end portion defining an opening, the sealing device including a body having a first section attached to a second section. The first section of the body is positionable within the opening in the filter element with the second section of the body facing the end portion of the filter element. The first section of the body has a larger coefficient of thermal expansion than the end portion of the filter element so that an increase in temperature results in the first section of the body expanding at a greater rate than the end portion of the filter element. These differing rates of expansion cause a compressive force to be exerted between the first section of the body and the end portion of the filter element.

The present invention also provides a assembly for a filter element which has an opening. The sealing assembly includes a body having a body section which is positionable in the opening of the filter element and a compressible material disposed around the body section. The body section has a coefficient of thermal expansion that differs from the coefficient of thermal expansion of the filter element, so that an increase in temperature results in the body section expanding at a greater rate than the filter element. These differing rates of expansion cause a compressive force to be exerted on the compressible material between the body section and the filter element, forming a seal.

Embodiments of the present invention thus use an entirely different mechanism from the conventional devices to maintain a seal: the sealing device and the filter element may have different coefficients of thermal expansion and these different coefficients of thermal expansion may be used advantageously to increase the reliability, effectiveness, and efficiency of a seal.

BRIEF DESCRIPTION OF THE DRAWINGS

FIG. 3A is a top view of the sealing device of FIG. 2;

FIG. 3B is a side view of the sealing device of FIG. 3A;

FIG. 4 is a sectional view of a second embodiment of a filter assembly according to the present invention; and FIG. 5 is a sectional view showing details of a third embodiment of a filter assembly according to the present invention.

DESCRIPTION OF THE PREFERRED EMBODIMENTS

Figure 1:
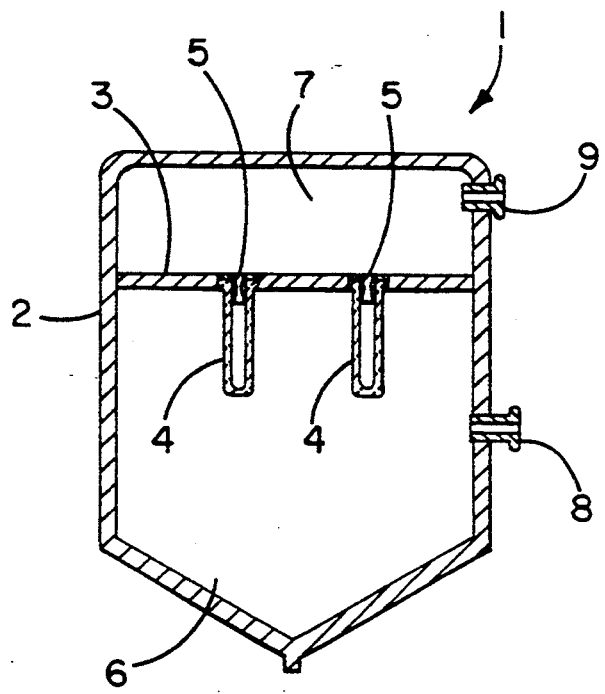
FIG. 1 is a sectional view of a first embodiment of a filter assembly device according to the present invention.

Referring to FIG. 1, a first exemplary filter assembly 1 embodying the present invention generally comprises a pressure tank 2, a rigid sheet or tube sheet 3 extending across the interior of the tank, one or more filter elements 4 disposed within the tank 2, and one or more sealing devices 5 for sealing the filter elements 4 to the tube sheet 3. An inlet portion 6 of the pressure tank 2 may be sealed from an outlet portion 7 of the pressure tank 2 by the tube sheet 3. An inlet 8 may be coupled to the inlet portion 6 for providing a fluid to the filter assembly 1. An outlet 9 may be coupled to the outlet portion 7 for removing the fluid once it has passed through the filter elements 4. Optionally, a back flow cleaning system (not shown) can be provided for supplying a high pressure fluid in the reverse direction for cleaning the filter elements 4 and a cooling system (not shown) including coolant tubes can be provided in the tube sheet to maintain the temperature of the tube sheet below a predetermined value.

Each filter element 4 is preferably narrow and elongated. It may include a closed or blind end, an open end, and a porous side wall. The side wall extends from the closed end to the open end and has an internal surface which defines a cavity that opens at the open end. The filter element 4 is preferably a filter constructed of a porous ceramic. The ceramic may be made of such compositions as $Si_3N_4$, mullite, cordierite (MgO, $Al_2O_3$, $SiO_2$), fireclay, aluminosilicate fibers, alumina, alumina/mullite, and silicon carbide-based materials. In a preferred embodiment, a hollow, porous, ceramic candle filter is used as the filter element 4.

Figure 2:
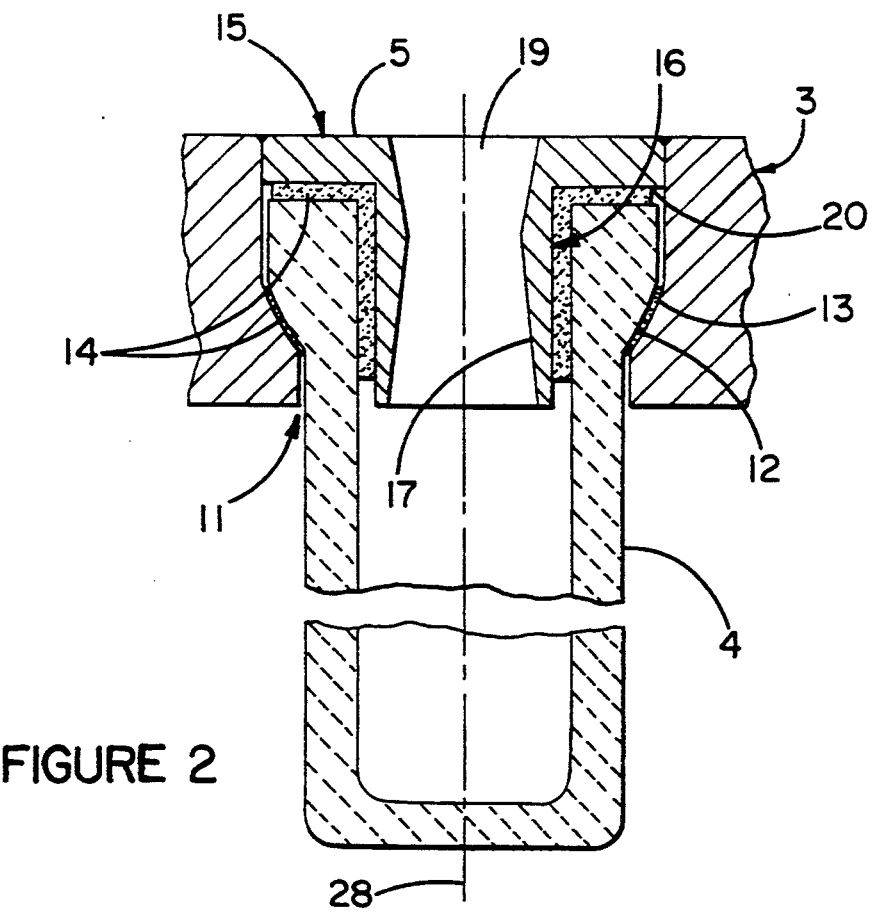
FIG. 2 is a sectional view showing the details of the sealing device employed in the filter assembly of FIG. 1.

FIG. 2 illustrates a sectional view of the details of the location of the filter element 4 in the tube sheet 3 of a first embodiment of the filter assembly 1 of FIG. 1. In this embodiment, the filter element 4 is slidably inserted from the upper side of the tube sheet 3 through a hole or aperture 11 in the tube sheet 3. The open end of the filter element 4 may include a flange 12 which prevents the filter element 4 from passing completely through the aperture 11. The flange 12 may be at any suitable angle to an axis 28 of the filter element 4. If the flange is at a right angle, the flange may engage the top of the tube sheet 3 or a lip formed in the wall defining the aperture 11. In the first embodiment, the flange 12 slopes upwardly at an acute angle and cooperates with a corresponding locating profile 13, e.g., an annular bevel, in the aperture wall.

In accordance with one aspect of the invention, a sealing device 5 is preferably utilized to seal the filter element 4 to the tube sheet 3. In the first embodiment, the sealing device 5 also functions as a hold-down element for securing each filter element 4 to the tube sheet 3. The sealing device 5 may be fabricated as a single unitary piece or from two or more separate sections by, for example, machining, forming, stamping, or casting. If it is made from two or more separate sections, the sections of the sealing device 5 may be joined together by various methods such as a welded, threaded, or press fit connection. Further, the sealing device 5 may be variously configured without departing from the scope of the invention. For example, the illustrated sealing device 5, as shown in FIGS. 3-4, may include a flat planar or disk section 15 and a hollow cylindrical section 16 which are unitarily formed. In a preferred embodiment, it may be desirable for a planar bottom surface of the disk section 15 to have a larger diameter than the cylindrical section 16 and extend radially out beyond an outer surface 21 of the hollow cylindrical section 16, forming the bottom annular surface 20.

The sealing device 5 includes an internal passage 19 passing through the device from one open end to another. For example, in the illustrated sealing device 5, the passage 19 extends axially through the hollow cylindrical section 16 and through the planar surface of the disk section 15. The configuration of the internal passage 19 may or may not be arranged in such a manner as to act as a venturi or nozzle 17. The nozzle 17, or an alternative capillary (jet) configuration, can be used to increase the velocity of fluid flowing in the back flow direction and, thus, to enhance the blowback effectiveness when the filter elements 4 are cleaned. In an alternative embodiment, it my be preferable for the internal passage 19 to be configured as a plurality of internal passages. At least one of these plurality of internal passages may be formed into a nozzle, capillary, or jet configuration to provide a means for increasing back flow efficiency. In yet another embodiment, the internal passage may simply be a cylindrical bore.

Chemical corrosion may occur as a result of chemicals in the fluids processed through the filter assembly. As a result, the sealing device 5 is preferably manufactured from a material which resists corrosion, for example, a high temperature, corrosion resistant, metal alloy such as RA333, available from Rolled Alloys of Temperance, Mich.

The sealing device 5 is shown in FIG. 2 as it might appear installed in a filter assembly 1. The sealing device 5 is placed over the top of the filter element 4 with the hollow cylindrical section 16 extending for some distance into the internal cavity of the filter element 4. For example, the cylindrical section 16 of the sealing device 5 may extend into the internal cavity of the filter element 4 a distance at least as great as the thickness of the tube sheet 3. It may be desirable to position a compressible cushioning and/or sealing material 14 between the filter element 4 and the tube sheet 3 and/or between the sealing device 5 and the filter element 4. In a preferred embodiment, the compressible material 14 may be a high temperature gasket material, most preferably a ceramic fiber material such as that available from 3M Corporation under the trade designation Interam.

In the illustrated embodiment, the compressible material 14 is disposed between the filter element 4 and the tube sheet 3 only at the portion of the tube sheet forming the locating profile 13. Of course, it is possible to have the compressible material 14 located over the entire area between the filter element 4 and the tube sheet 3. The openings in the tube sheet 3 may have portions that closely match the profile of the outer portion of the filter element 4 and, in particular, the flange 12. The compressible material 14 placed between the tube sheet and the filter element 4 acts to dampen any vibration which may be transferred to the filter element 4 from the pressure tank 2.

In a preferred embodiment, it may be desirable to place the compressible material 14 between the disk section 15 of the sealing device 5 and the top of the filter element 4 as well as between the outside of the hollow cylindrical section 16 of the sealing device 5 and the internal surface of the filter element 4. The compressible material 14 acts as a cushion and/or a sealing gasket. The compressible material 14 may also act to prevent uneven stresses from being generated in the filter element 4 due to non-uniformities on the interacting surfaces of the filter element 4, the sealing device 5, and/or the tube sheet 3. The use of the compressible material 14 is particularly useful when the filter element 4 is a ceramic material. A ceramic material has a much lower ductility, i.e., less of an ability to deform under stress before fracture. When two surfaces are in contact, the area of contact is typically the highest points on the two surfaces. As a compressive force is applied, because of the ductility of the materials in contact, the high points in contact deform and allow a progressively larger portion of the two surfaces to come in contact, thereby reducing the stresses at the points of contact. Ceramic has very low ductility and tends to concentrate stresses over the initial contact points. When a compressible material is used in the interface of two ceramic surfaces or a ceramic surface and a metallic surface, the stress distribution is significantly improved. The use of the compressible material reduces the likelihood of fractures due to this stress.

A preload force may be used to compress the compressible material 14 between the top of the filter element 4 and the bottom annular surface 20 of the hold-down disc section 15. The preload force should preferably be of a magnitude to sufficiently compress the compressible material 14 to prevent fluid flow between the bottom surface 20 of the hold-down disc section 15 and the top of the filter element 4. The preload force may be maintained on the sealing device 5 by securing the sealing device 5 to the tube sheet 3 by any suitable method, including some type of mechanical method or mechanism such as welding, bolting, threading, latching, locking, or a pin-and-hole connection. The method of connection should be capable of withstanding vibrations and thermal shock resulting, for example, from pulse cleaning of the filter elements. In the illustrated embodiment, the disk section 15 of the sealing device is welded to the tube sheet. The weld further functions as a seal preventing the fluid to be filtered from bypassing the filter element 4.

In accordance with another aspect of the invention, the sealing device 5 and the filter element 4 preferably have different rates of thermal expansion and these different rates of thermal expansion effect a seal between the filter element 4 and the sealing device 5 throughout the entire range of system temperatures. During start up or shutdown and at other times, the filter assembly is at relatively low temperature and pressure, e.g. atmospheric pressure and room temperature. A seal is then preferably maintained between the top of the filter element 4 and the disc section 15 of the sealing device 5 by compression of the compressible material 14 due to the compressive preload placed on the sealing device 5 during installation.

On the other hand, operating temperature and pressure may be much higher. For example, the filter assembly 1 may be operated at a temperature of around 300° C. to 1000° C. and at a pressure of around 2 to 10 atmospheres. Embodiments of the present invention preferably utilize a sealing device and a filter element 4 having different coefficients of thermal expansion and take advantage of the different rates of thermal expansion to further seal the filter element 4 to the sealing device at these elevated temperatures. For example, in a preferred embodiment, the sealing device 5 may be constructed from a metal alloy while the filter element 4 may be constructed from a ceramic. Ceramics typically have a much lower coefficient of thermal expansion than metals. Thus, as the temperature of the filter assembly 1 is increased during operation, the sealing device 5 may expand at a faster rate than does the filter element 4 due to the different coefficients of thermal expansion of metals and ceramics.

The increase in temperature may result in a gradual increase in the relative distance between the top of the filter element 4 and the bottom surface 20 of the hold-down disc section 15. This may reduce the compressive force on the compressible material 14 between the top of the filter element 4 and the bottom surface 20 of the hold-down disc section 15 and, thereby, reduce sealing efficiency. However, although the sealing efficiency may be reduced between the top of the filter element 4 and the bottom of the hold-down disc section 15, the overall sealing efficiency between the filter element 4 and the sealing device 5 is retained. The increase in temperature also results in the hollow cylindrical section 16 of the sealing device 5 expanding radially at a faster rate than the filter element 4. This has the effect of reducing the clearance between the hollow cylindrical section 16 and the internal surface of the filter element 4, thus compressing the compressible material 14 and sealing the cylindrical section 16 of the sealing device 5 against the internal surface of the filter element 4 even tighter. In this way an effective seal is maintained throughout the entire range of system temperatures.

Embodiments of the present invention have the added advantage that the stress from thermal shock and vibration is redistributed to an elongated area along the internal surface of the filter element 4, reducing the stress at the flange. As previously cited, cracking of the flange is a common failure of the filter elements. Embodiments of the present invention can extend into the filter element 4 a significant distance beyond the flange, even beyond the depth of the tube sheet. In this manner, the stress caused by vibration and thermal shock is distributed over a wider area of the filter element. In addition, if a crack does occur at the flange, embodiments of the present invention may prevent any particulate leakage at operating temperatures since the hollow cylindrical section of the sealing device provides a seal that can extend below the flange of the filter element.

A second exemplary filter assembly embodying the present invention is illustrated in FIG. 4. (Many of the components of the second embodiment are similar to the components of the first embodiment and are identified by identical reference numerals.) In this embodiment, the sealing device comprises a tube sheet 3 having a hollow cylindrical portion 37 located about an aperture 11 in the tube sheet 3. While the hollow cylindrical portion may protrude from the lower surface of the tube sheet, in the illustrated embodiment it protrudes from the upper surface. The hollow cylindrical portion may be joined to the tube sheet by various methods such as a welded, threaded, or press fit connection, or may be formed integral therewith.

The filter element 4 is preferably a ceramic filter, such as a ceramic candle filter, and it may be fabricated according to conventional techniques, such as molding, isostatic pressing, extrusion, or machining. The filter element 4 has an open end portion which includes a flange 12. The flange 12, in turn, may include an opening such as an annular groove 23 located above the internal cavity of the filter element 4 with the tube sheet facing the end portion of the flange 12. While the annular groove may face upwardly in the direction of the open end, in the illustrated embodiment it faces downwardly in the direction of the closed end of the filter element.

The hollow cylindrical portion 37 of the tube sheet engages the annular groove in the filter element 4. A compressible sealing and/or cushioning material 14 may be disposed anywhere between the tube sheet and the filter element, for example, between an outer cylindrical wall surface 38 of the hollow cylindrical portion 37 and an inner facing surface 39 of the annular groove 23.

The sealing device of this second embodiment does not function as a hold-down device. Consequently, a separate hold-down device, for example, a clamping mechanism such as a hold-down plate, may be coupled to the tube sheet for securing each filter element to the tube sheet and providing a preload force for urging the filter element toward the tube sheet as previously explained with regard to the first embodiment. However, with the hollow cylindrical portion 37 protruding upwardly and the annular groove 23 facing downwardly, the weight of the filter element 4 urges the flange 12 toward the hollow cylindrical portion 37. If the downward gravitational force resulting from the weight of the filter element 4 substantially exceeds any upward force on the filter element 4 created by fluid flowing through the filter assembly, then the hold-down device may not be necessary.

In operation, the second embodiment functions similarly to the operation of the first embodiment. The tube sheet 3 is made of a substance, e.g., a metal such as stainless steel, that expands at a higher rate with temperature than the substance, e.g., a ceramic, that the filter element 4 is made of. As the temperature rises, the circumference of the hollow cylindrical portion 37 of the tube sheet 3 increases at a higher rate than the circumference of the annular groove 23 of the filter element 4. Thus, at elevated temperatures, the differing coefficients of thermal expansion between the tube sheet 3 and the filter element 4 cause the compressible material 14 to be compressed between the outer cylindrical wall surface 38 of the hollow cylindrical portion 37 and the inner facing surface 39 of the annular groove 23 which faces the internal passage, thereby sealing the filter element to the tube sheet and more evenly distributing stress along the flange of the filter element. This second embodiment has the further advantage that the hollow cylindrical portion 37 is not disposed directly in the fluid flow path and, therefore, is less susceptible to corrosion and can be easily cooled using the same system which is utilized to cool the tube sheet 3.

A third embodiment of the invention is illustrated in FIG. 5. (Many of the components of the third embodiment are similar to the components of the first embodiments and are identified by identical reference numerals.) In this embodiment, the sealing device also comprises a tube sheet 3 having a hollow cylindrical portion 37 disposed about an aperture 11 in the tube sheet 3. The hollow cylindrical portion 37 defines an internal passage 19 which is coupled to the aperture 11. The internal passage 19 may include a means for increasing back flow efficiency as discussed with respect to the first embodiment. The tube sheet 3 and the hollow cylindrical section 36 may be integrally formed by, for example, machining, forming, stamping, or casting. If the tube sheet 3 and hollow cylindrical section 36 are made from two or more separate elements, they may be coupled by various methods such as a welded, threaded, latched, locked, or press fit connection.

The filter element 4 has an open end which includes a flange 12. The hollow cylindrical portion 37 is capable of being fitted within and extending for some distance into the open end of the filter element 4 with the tube sheet 3 facing the end portion of the filter element 4. The compressible material 14 may be disposed anywhere between the tube sheet 3 and the filter element 4, for example, between the inner facing surface of the filter element 4 and an outer cylindrical wall surface 38 of the hollow cylindrical section 37.

In this embodiment, the filter elements 4 may be arranged so that the open end of each filter element 4 is abutting the lower surface of the tube sheet 3. Consequently, it is not necessary to insert the filter elements 4 through the apertures 11 in the tube sheet 3; the filter elements may simply be fitted to the hollow cylindrical portions 37 from the underside of the tube sheet. To secure the filter elements to the tube sheet, a support plate 26 may be coupled to the tube sheet 3 and/or a support grid 22 may be coupled to the pressure tank 2 at the closed ends 27 of the filter elements 4. The support plate 26 and support grid 22 may be respectively coupled to the tube sheet 3 or bottom surface of the pressure tank 2 by various methods such as a welded, threaded, latched, locked, press fit, or pin-in-hole connection. A compressible sealing and/or cushioning material 14 may be located between the flange 12 of the filter element 4 and the support plate 26 to evenly distribute the load and reduce stress on the flange and/or between the closed end 27 of the filter element support grid 22 to evenly distribute the weight of the filter element 4. The support plate 26 or support grid 22 may be configured to provide a preload force on the compressible material as previously explained with regard to the first embodiment.

In operation, the third embodiment functions similarly to the first and second embodiments. The tube sheet 3 is made of a substance, e.g., a metal such as stainless steel, that expands at a higher rate with temperature than the substance, e.g., a ceramic, that the filter element 4 is made of. As the temperature rises, the circumference of the hollow cylindrical section 37 increases at a higher rate than the circumference of the internal surface of the filter element 4. Thus, at elevated temperatures, differing coefficients of thermal expansion between the tube sheet 3 and the filter element 4 cause the compressible material 14 to be compressed between the outer cylindrical wall surface 38 of the hollow cylindrical section 37 and the inner facing surface of the filter element 4. This seals the filter element to the tube sheet and evenly distributes stress along the filter element. This third embodiment has the further advantage that the hollow cylindrical section 37 can be easily cooled using the same system which cools the tube sheet 3.

While several exemplary filter assemblies embodying the present invention have been shown, it will be understood, of course, that the invention is not limited to these embodiments. Modification may be made by those skilled in the art, particularly in light of the foregoing teachings. It is, therefore, intended that the appended claims cover any such modifications which incorporate the features of this invention or encompass the true spirit and scope of the invention. For example, the sealing device may be configured in a mirror image in which a hollow cylindrical section may be coupled to both planar surfaces of the disc section or tube sheet. In this manner, the mirror image configuration may be utilized to connect two filter elements in a serial or parallel arrangement. Further, although a cylindrical shape is preferred, the filter elements and sealing devices illustrated herein are not limited to a cylindrical shape.

We claim:

1. A filter assembly comprising:
   a sealing device having first and second surfaces;
   a filter element having a first surface disposed about the first surface of the sealing device and a second surface adjacent to the second surface of the sealing device, the filter element having a coefficient of thermal expansion differing from the coefficient of thermal expansion of the sealing device; and
   a compressible material disposed between the first surface of the filter element and the first surface of the sealing device and between the second surface of the filter element and the second surface of the sealing device wherein the sealing device, the filter element, and the compressible material comprise sealing means for compressing the compressible material between the second surfaces at a first temperature, for compressing the compressible material between the first surfaces at a second temperature higher than the first temperature, and for forming a seal at both the first and second temperatures responsive to the differing coefficients of thermal expansion.

2. The filter assembly as claimed in claim 1 wherein the filter element comprises a ceramic.

3. The filter assembly as claimed in claim 1 including:
   a tank; and
   an member disposed within the tank for dividing the tank between an inlet portion and an outlet portion wherein the sealing device and the filter element are coupled to the member.

4. The filter assembly as claimed in claim 1 wherein the sealing device is a tube sheet, the filter element being disposed in an aperture in the tube sheet.

5. The filter assembly as claimed in claim 1 wherein the sealing device is disposed within an annular groove within the filter element.

6. The filter assembly as claimed in claim 1 wherein the compressible material comprises a high temperature gasket material.

7. The filter assembly device as claimed in claim 1 wherein the sealing device is disposed within an internal cavity within the filter element.

8. The filter assembly as claimed in claim 1 wherein the filter element has a closed end, an open end, and defines an internal cavity therebetween.

9. The filter assembly as claimed in claim 1 wherein the sealing device comprises a metal and the filter element comprises a ceramic candle filter.

10. The filter assembly as claimed in claim 9 wherein the first and second surfaces are substantially orthogonal.

11. The filter assembly as claimed in claim 1 wherein the sealing device has a first section having a cylinder-shaped configuration and a second section having a disk-shaped configuration coaxially mounted to the first section, an outer diameter of the first section being less than the outer diameter of the second section.

12. The filter assembly as claimed in claim 1 wherein the first section has an internal passage defining a fluid flow path.

13. The filter assembly as claimed in claim 12 wherein the internal passage includes means for increasing back flow efficiency.

14. The filter assembly as claimed in claim 1 wherein the compressible material compressed between the second surfaces has a first compressive force at the first temperature and a second compressive force, less than the first compressive force, at the second temperature.

15. The filter assembly as claimed in claim 14 wherein the compressible material compressed between the first surfaces has a first compressive force at the first temperature and a second compressive force, greater than the first compressive force, at the second temperature.

16. A filter assembly comprising:
   a filter element having a porous ceramic tube having a flange including an annular groove, the annular groove having an inner periphery sidewall facing away from the center axis and an outer periphery sidewall facing the center axis; and
   an annular metal sealing device removably disposed within the annular groove wherein a distance between the outer periphery side wall and the annular metal sealing device decreases with increasing temperature, the filter element having a coefficient of thermal expansion differing from a coefficient of thermal expansion of the annular metal sealing device, wherein the annular metal sealing device and the filter element comprise sealing means responsive to differing coefficients of thermal expansion between the filter element and the annular metal sealing device, to a positioning of the annular metal sealing device and the ceramic filter, and to an increase in temperature of the filter assembly.

17. The filter assembly of claim 16 including a compressible material disposed between the annular metal sealing device and the annular groove, wherein the compressible material is compressed at elevated temperatures.

18. The filter assembly as claimed in claim 17 wherein the compressible material is disposed between an outer facing peripheral side wall of the annular metal sealing device and an inner facing peripheral side wall of the annular groove.

19. A filter assembly for filtering high temperature gases, the filter assembly comprising:
a tank;
a tube sheet disposed within the tank and dividing the tank between an inlet portion and an outlet portion, the tube sheet including a sealing device having first and second surfaces disposed about an aperture in the tube sheet;
a ceramic candle filter element having first and second annular surfaces respectively disposed about the first surface of the sealing device and adjacent to the second surface of the sealing device wherein the ceramic candle filter element has a coefficient of thermal expansion that differs from a coefficient of thermal expansion of the sealing device;
a compressible material respectively disposed between the first and second surfaces of the filter element and the first and second surfaces of the sealing device wherein the sealing device, the ceramic candle filter, and the compressible material comprise sealing means responsive to the differing coefficients of thermal expansion and the positioning of the sealing device, the ceramic filter, and the compressible material, the sealing means for compressing the compressible material between the first and second surfaces at a first temperature, the compression between the first surfaces increasing responsive to an increase in temperature above the first temperature.

20. A filter assembly for filtering high temperature gases, the filter assembly comprising:
a porous ceramic tubular filter element having a center axis and an annular flange disposed about the center axis, the annular flange including an annular groove, the annular groove having an inner periphery sidewall facing away from the center axis and an outer periphery sidewall facing the center axis;
an annular metal sealing device removably disposed within the annular groove; and
a compressible material disposed between the annular metal sealing device and the annular groove wherein a compression of the compressible material increases with increasing temperatures, the porous ceramic tubular filter element having a coefficient of thermal expansion differing from a coefficient of thermal expansion of the annular metal sealing device, wherein the annular metal sealing device, the compressible material, and the porous ceramic tubular filter element comprise sealing means for forming a compressive seal between the annular metal sealing device and the porous ceramic tubular filter element responsive to differing coefficients of thermal expansion in combination with an increase in temperature of the filter assembly.

21. The filter assembly as claimed in claim 20 wherein the compressible material is disposed between an outer peripheral side wall of the annular metal sealing device and the outer peripheral side wall of the annular groove.

* * * * *

UNITED STATES PATENT AND TRADEMARK OFFICE
CERTIFICATE OF CORRECTION

PATENT NO.   : 5,401,406          Page 1 of 2
DATED        : March 28, 1995
INVENTOR(S)  : Johnson et al.

It is certified that error appears in the above-indentified patent and that said Letters Patent is hereby corrected as shown below:

On title page,
Item [56], U.S. Patent Documents, line 39, delete "Pollack" insert --Pollock--.

Foreign Patent Documents, add --2262053 6/1993 United Kingdom--;

add --0446422 9/1991 EPO--;

add --0345491 12/1989 EPO--;

add --9014198 4/1991 Germany--;

add --9216259 4/1993 Germany--.

Column 9, Line 62, change "filter element comprises a ceramic" to --first and second surfaces are substantially orthogonal--.

UNITED STATES PATENT AND TRADEMARK OFFICE
CERTIFICATE OF CORRECTION

PATENT NO. : 5,401,406
DATED : March 28, 1995
INVENTOR(S) : Johnson, et al.

It is certified that error appears in the above-indentified patent and that said Letters Patent is hereby corrected as shown below:

Column 10, lines 20-21, "first and second surfaces are substantially orthogonal" to --compressible material comprises ceramic fibers--.

Signed and Sealed this

Twenty-ninth Day of August, 1995

Attest:

BRUCE LEHMAN

*Attesting Officer*      *Commissioner of Patents and Trademarks*